US009152430B2

(12) United States Patent
Bhargava et al.

(10) Patent No.: US 9,152,430 B2
(45) Date of Patent: Oct. 6, 2015

(54) METHOD FOR LOW POWER BOOT FOR MICROCONTROLLER

(71) Applicants: Prashant Bhargava, Gurgaon (IN); Mohit Arora, Faridabad (IN); Martin Mienkina, Bystrice nad Olsi (CZ); Sudhi R. Proch, Greater Noida (IN)

(72) Inventors: Prashant Bhargava, Gurgaon (IN); Mohit Arora, Faridabad (IN); Martin Mienkina, Bystrice nad Olsi (CZ); Sudhi R. Proch, Greater Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 387 days.

(21) Appl. No.: 13/910,092

(22) Filed: Jun. 4, 2013

(65) Prior Publication Data

US 2014/0359264 A1 Dec. 4, 2014

(51) Int. Cl.
*G06F 1/32* (2006.01)
*G06F 9/24* (2006.01)
*G06F 9/44* (2006.01)
G06F 1/24 (2006.01)
G06F 1/30 (2006.01)
G06F 11/14 (2006.01)

(52) U.S. Cl.
CPC ............ *G06F 9/4406* (2013.01); *G06F 1/3243* (2013.01); *G06F 1/24* (2013.01); *G06F 1/30* (2013.01); *G06F 1/3203* (2013.01); *G06F 1/3237* (2013.01); *G06F 9/4401* (2013.01); *G06F 11/1417* (2013.01)

(58) Field of Classification Search
CPC ........... G06F 1/24; G06F 1/30; G06F 1/3203; G06F 1/3237; G06F 1/3243; G06F 9/4401; G06F 11/1417
USPC .......................... 713/1, 2, 100, 300, 322, 323
See application file for complete search history.

(56) References Cited

U.S. PATENT DOCUMENTS

| 7,123,068 | B1 | 10/2006 | Hoover |
| 7,908,500 | B2 | 3/2011 | Westwick |
| 2006/0212679 | A1* | 9/2006 | Alfano et al. .................... 712/38 |
| 2010/0214866 | A1* | 8/2010 | Zhang ....................... 365/233.12 |
| 2010/0313042 | A1 | 12/2010 | Shuster |
| 2012/0253535 | A1 | 10/2012 | Newman, Jr. |

* cited by examiner

*Primary Examiner* — Michael J Brown
(74) *Attorney, Agent, or Firm* — Charles Bergere

(57) ABSTRACT

A microcontroller includes a clock generator having an internal reference clock, a system mode controller establishing an operating mode, a flash memory having an internal clock and a non-volatile option register, and a boot mode selection logic circuit coupled to the system mode controller and the flash memory. The logic circuit outputs a boot mode selection signal instructing the microcontroller to boot in a very low power run (VLPR) mode or a RUN mode. The system mode controller enters the VLPR or RUN mode in response. The flash memory bypasses and disables its internal clock prior to calibration of the flash memory in the VLPR mode and prior to initialization of the flash memory in the RUN mode. The flash memory subsequently uses an external clock signal based on the output of the internal reference clock.

17 Claims, 4 Drawing Sheets

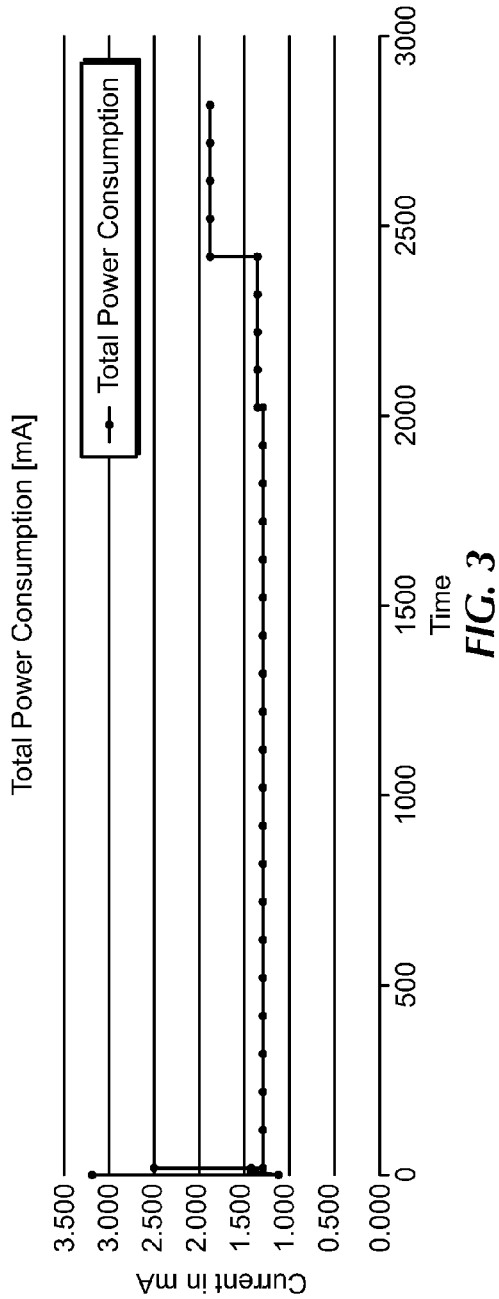
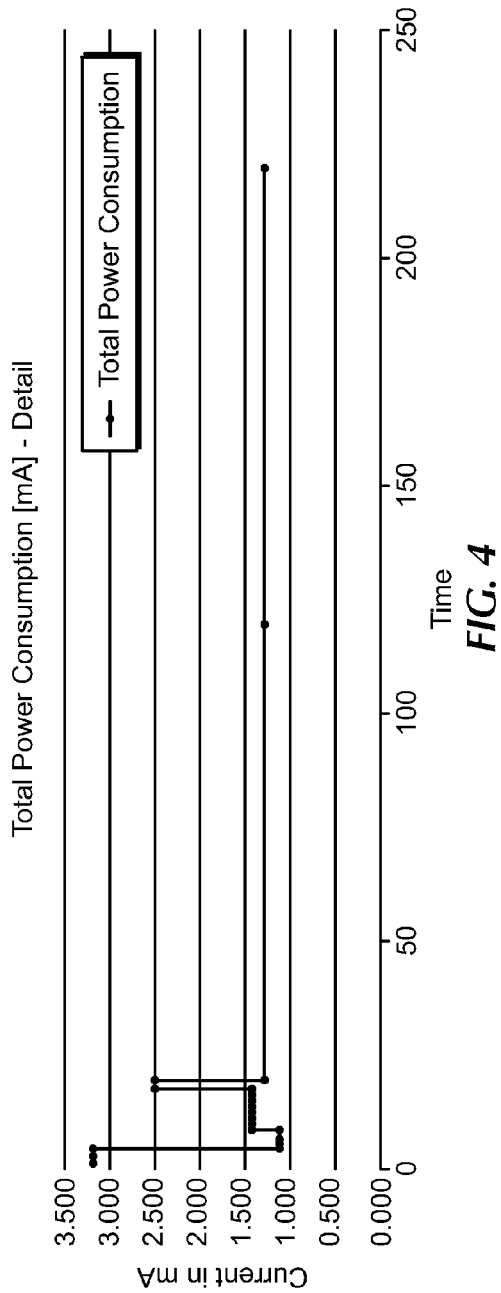

METHOD FOR LOW POWER BOOT FOR MICROCONTROLLER

BACKGROUND OF THE INVENTION

The present invention is directed to microcontrollers and, more particularly, to a method of resetting and booting a microcontroller in low power mode.

Power critical applications, such as in medical devices, metering devices, and the like, do not often include power sources capable of generating high currents. Thus, a microcontroller unit (MCU) in the device must ration the current among all resources requiring power consumption. Reset and boot cycles for the MCU can present a problem with power consumption. For example, the MCU in a device may require 16-18 milliAmperes (mA) of current while the existing power source can budget no more than 7 mA.

The main contributors to power drain during reset and boot sequences of the MCU are the flash memory, the system-on-chip (SoC) logic and the number of peripherals that are active following the reset sequence, and the use of a high frequency clock source during the boot sequence.

It is desirable to provide an MCU and a method of resetting and booting the MCU that requires less power and could therefore be used in current limited applications.

BRIEF DESCRIPTION OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale.

In the drawings:

FIG. 3 is a plot of current level over time during a reset and boot sequence of a microcontroller in a "RUN" mode or normal operation mode, in accordance with a preferred embodiment of the present invention;

FIG. 4 is a partially enlarged portion of the plot of FIG. 3;

DETAILED DESCRIPTION OF THE INVENTION

Figure 1:
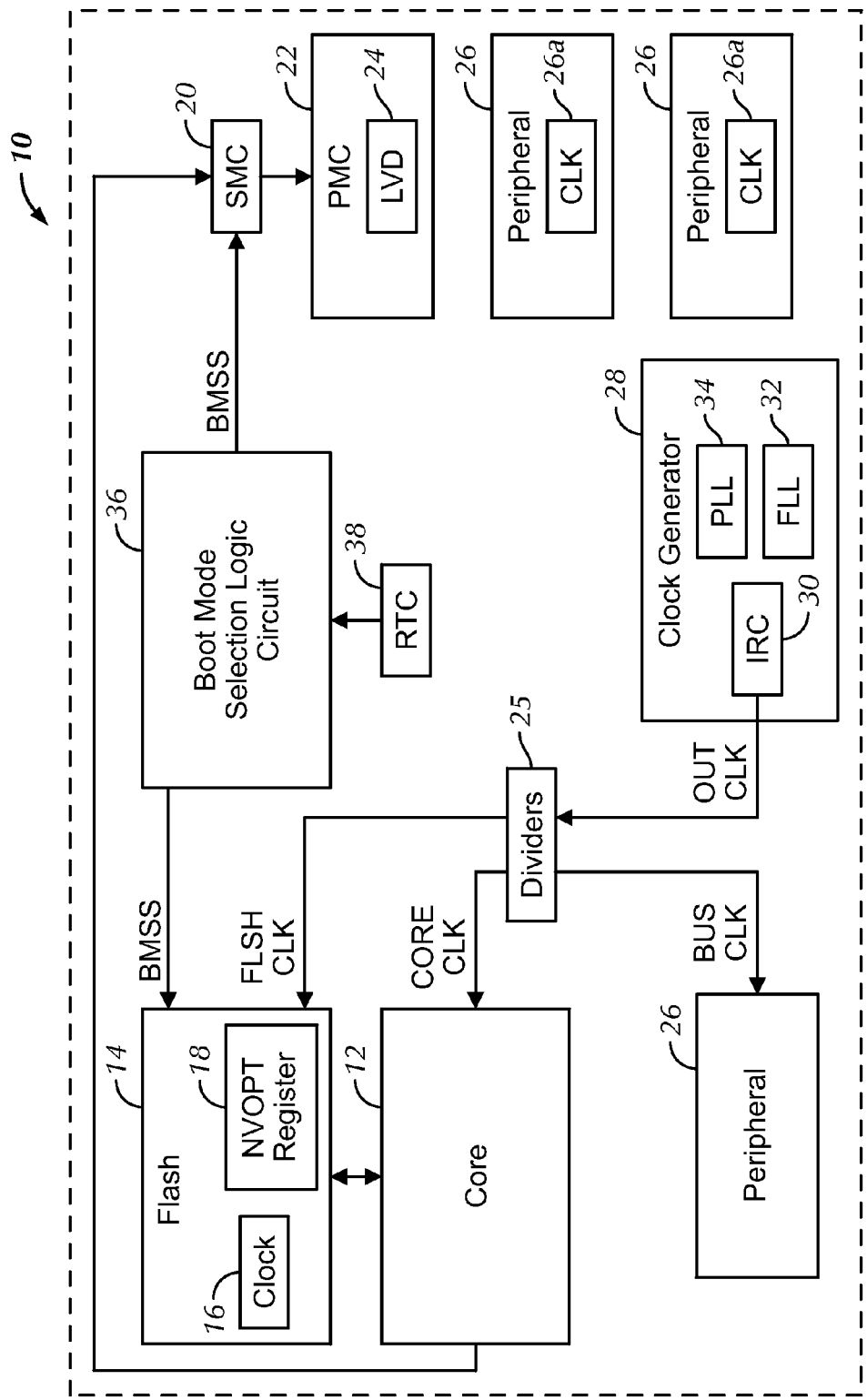
FIG. 1 is a schematic block diagram of a microcontroller in accordance with a preferred embodiment of the invention.

Referring to the drawings, wherein the same reference numerals are used to designate the same components throughout the several figures, there is shown in FIG. 1 a microcontroller unit (MCU) 10 having at least one central processing unit (CPU) core 12. In one preferred embodiment, the core 12 may be a 32-bit CORTEX-M0+ processor commercially available from ARM Holdings in Cambridge, UK. The core 12 reads and executes most, if not all, of the instructions stored or sent to the MCU 10 for operation of the MCU 10 or the device in which the MCU 10 is contained. The core 12 is further configured to execute a boot code following a reset sequence. The boot code contains the necessary instructions for initializing the MCU 10 for operation following the reset sequence.

The core 12 is preferably coupled to a flash memory 14 configured to store device options or similar data for use by the MCU 10. In the embodiment shown in FIG. 1, the flash memory 14 includes 128 kB of non-volatile memory space. Although a flash memory 14 is used in the MCU 10, other memory types may also be used, such as EEPROM or the like.

The flash memory 14 includes an internal clock 16 that the flash memory 14 utilizes for execution of its tasks. Ordinarily, the internal clock 16 would also be utilized during resetting and boot sequences of the MCU 10 for calibration and initialization of the flash memory 14. In preferred embodiments of the MCU 10, the internal clock 16 operates at about 25 MHz.

The flash memory 14 further includes a non-volatile option register 18 which stores data or information that is fetched by the flash memory 14 during or shortly after the reset sequence of the MCU 10. The fetched information includes data used during the boot sequence, for example, by the core 12 or the like.

The core 12 is also preferably coupled to a system mode controller (SMC) 20, which establishes an operating mode of the MCU 10. For example, the SMC 20 may place the MCU 10 into a "RUN" mode, which is preferably the ordinary operating mode where the core 12 is fully functional and the distribution of voltage by a power management controller (PMC) 22 is fully regulated. A low voltage detector (LVD) circuit 24 is provided in the PMC 22 as protection against drops in voltage levels across the MCU 10. The SMC 20 may also place the MCU 10 into a "wait" mode, where the core 12 is in a sleep state, reducing power, but peripheral modules 26 continue to function and are clocked. The SMC 20 may further place the MCU 10 into a "stop" mode, where the core 12 is in a sleep state and all peripheral modules 26 are optionally stopped. Preferably, the power is still sufficient to maintain the LVD 24 protection.

As will be described in further detail below, the SMC 20 also preferably is able to place the MCU 10 into a "very low power run" (VLPR) mode, wherein the clock frequencies of the core 12 and the flash memory 14 are restricted, and the PMC 22 operates to provide only enough power to run the MCU 10 at the reduced frequencies. The LVD 24 is preferably not operational in the VLPR mode. Peripheral modules 26 may be used as needed, but also run at reduced frequencies. Other operational modes for distribution and conservation of power may also be used.

The MCU 10 further includes a clock generator 28 having an internal reference clock 30. The internal reference clock 30 preferably oscillates in the range of 2-4 MHz. The internal reference clock 30 outputs an output clock signal OUTCLK that may be adjusted for use by various components of the MCU 10. For example, the output clock signal OUTCLK from the internal reference clock 30 may be received by dividers 25, which may generate a core clock signal CORECLK used by the core 12 and an external flash clock signal FLSHCLK received by the flash memory 14. In particular, the external flash clock signal FLSHCLK preferably has a frequency of about 1 MHz, and may be used by the flash memory 14 during the VLPR mode of operation of the MCU 10.

The clock generator 28 may have additional internal reference clocks (not shown) operating at various frequencies as needed for operation of the MCU 10. The clock generator 28 further preferably includes at least a frequency lock loop (FLL) 32 and a phase lock loop (PLL) 34 for control of output signals from the clock generator 28 that may be used by the core 12, the flash memory 14, or the like. In preferred embodiments, the clock generator 28 includes the above-described 2-4 MHz internal reference clock 30 and a further reference clock (not shown) coupled to the FLL 32 and PLL 34. In the VLPR mode, it is preferred that the FLL 32 and PLL 34 are bypassed.

The MCU 10 further includes a boot mode selection logic circuit 36 which outputs a boot mode selection signal BMSS to at least the SMC 20 and the flash memory 14. The boot mode selection signal BMSS designates whether the MCU 10 is to boot in the RUN mode or the VLPR mode. Thus, upon a reset and boot operation, the SMC 20 and the flash memory 14 perform various functions depending on the designation made by the boot mode selection signal BMSS.

For example, the boot mode selection signal BMSS is output during the reset sequence, and the SMC 20 therefore enters the VLPR mode or the RUN mode in response. It is preferred that regardless of the mode entered, the 2-4 MHz signal from the internal reference clock 30 of the clock generator 28 is selected as the default clock source. By selecting a slow clock source and bypassing the FLL 32 and PLL 34, a significant reduction in power can be achieved.

When the boot mode selection signal BMSS designates the VLPR mode, the flash memory 14 bypasses and disables its internal clock 16 prior to calibration. Thus, the flash memory 14 calibrates itself, fetches information from the non-volatile options register 18, and initializes using the external flash clock signal FLSHCLK, preferably at about 1 MHz. This contrasts greatly with the power required during the normal boot operation, wherein the flash memory 14 performs all of these functions using its internal clock 16 operating at about 25 MHz.

When the boot mode selection signal BMSS designates the RUN mode, however, the flash memory 14 calibrates and fetches the information from the non-volatile option register 18 using its internal clock 16. In order to gain the benefit of power savings while booting in the RUN mode, it is preferred that the information fetched from the non-volatile option register 18 include a bypass bit. When the flash memory 14 reads the bypass bit out of the non-volatile option register 18, the flash memory 14 is configured to disable and bypass the internal clock 16 and utilize the external flash clock signal FLSHCLK for the remaining initialization functions of the flash memory 14 during the reset and boot sequence.

It is preferred that one of the VLPR mode or the RUN mode be set as the default boot mode for the MCU 10 such that each reset and boot sequence is performed under the default mode for power saving. Further preferably, the MCU 10 will reset and boot in the RUN mode as a default, since debugger access is not available in the VLPR mode. However, it may be necessary to allow a user to override the default mode depending on the prevailing conditions of use. The override may be provided in any number of ways.

For example, the boot mode selection logic circuit 36 may be coupled to a battery-backed up real time clock (RTC) circuit 38 of the MCU 10. The RTC circuit 38 may store an override bit that, depending on the value, may cause the boot mode selection logic circuit 36 to alter the boot mode selection signal BMSS to designate the boot mode which is different than the set default boot mode. Since the RTC circuit 38 is powered by a separate dedicated battery power supply, loss of power to the MCU 10 will not effect the override bit stored in the RTC circuit 38.

Figure 2:
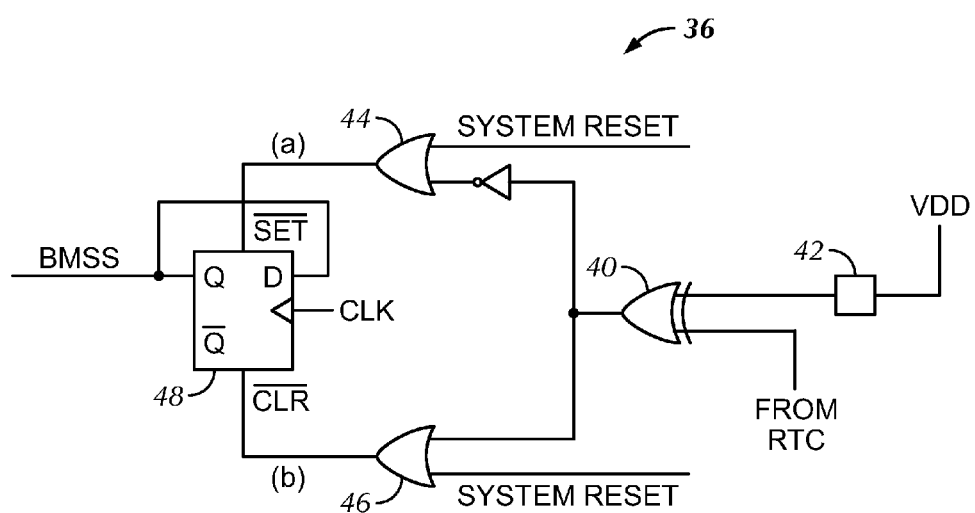
FIG. 2 is a schematic block diagram of a boot mode selection logic circuit in accordance with a preferred embodiment of the invention.

FIG. 2 shows an exemplary configuration for the boot mode selection logic circuit 36. An XOR gate 40 receives as inputs a default boot mode signal from an unbonded pad or option plug 42 of the MCU 10 and the override bit from the RTC circuit 38. The result of the XOR gate 40 is fed through additional OR gates 44, 46 and a flip-flop 48 to form the eventual boot mode selection signal BMSS. Essentially, the override bit from the RTC circuit 38 simply inverts the default option on the next MCU 10 system reset. If the override bit is not set or gets cleared, the default boot option returns on the next reset.

It is preferred that the override bit is only cleared by a power-on-reset of the RTC circuit 38, and is not affected by the system reset of the MCU 10, as a result of the RTC circuit 38 being powered by a back-up battery (not shown). On a power-on-reset of the RTC circuit 38, the override bit may be cleared and the boot mode selection signal BMSS may return to the default setting on the next system reset. The override bit can also be stored in locations other than the RTC circuit 38 for reading out by the boot mode selection logic circuit 36.

An alternative override method includes storing an override bit in the flash memory 14. When the core 12 reads the boot code, it will also read the override bit out of the flash memory 14 and, when the override bit is set to a value indicating override, the core 12 will instruct the SMC 20 to enter the boot mode which is different from the default boot mode. A limitation on this method is that the default boot mode is used until the boot code is executed. For example, the MCU 10 will boot in the VLPR mode until the boot code is executed and the core 12 instructs the SMC 20 to enter the RUN mode, whereafter the remainder of the boot sequence will occur in the RUN mode.

Other methods for overriding the default boot mode of the MCU 10 may be used as well.

Other components of the MCU 10 are also affected by the boot mode selection signal BMSS designation. For example, in the VLPR mode, the SMC 20 instructs the PMC 22 to fully regulate the voltage until initialization of the flash memory 14 is completed. Thereafter, the SMC 20 instructs the PMC 22 to only loosely regulate the voltage (i.e., strict adherence to a set voltage is not required). It is preferred in the RUN mode that no change to the operation of the PMC 22 is made.

In addition, most, and preferably all, of the peripheral modules 26 are disabled during reset, particularly in the VLPR mode. This can be achieved by, for example, gating internal clocks 26a of the peripheral modules 26 during and/or after the reset sequence. For peripheral modules 26 that rely on an external clock signal, such as BUSCLK received from the dividers 25, the external peripheral clock signal BUSCLK would also be gated during and/or after reset. Still further, the FLL 32 and the PLL 34 are disabled during and/or after the reset sequence, ensuring that none of the components of the MCU 10 is utilizing a clock in excess of the output clock signal OUTCLK of the 2-4 MHz internal reference clock 30 of the clock generator 28 during the boot sequence.

Embodiments of the present invention achieve a lowest possible current consumption during a boot in either the VLPR or the RUN modes, while balancing the need for booting of the MCU 10 to occur within a reasonable time period. The techniques described herein minimize current spikes during the boot sequence of the core 12 and naturally fits with battery operating MCUs 10. Boot selection is also performed without a dedicated MCU 10 pin, and does not require a hardware change to be set.

FIG. 3 is a plot of current levels during a reset and boot sequence of an MCU 10 in the RUN mode using an internal reference clock 30 at 2 MHz. FIG. 4 is an enlargement of the plot of FIG. 3 in the first 200 ms. As can be seen from these plots, the peak generated current level during the reset and boot sequence was between 3 and 3.5 mA, with the duration of the sequence falling between 1 and 1.5 mA.

Figure 5:
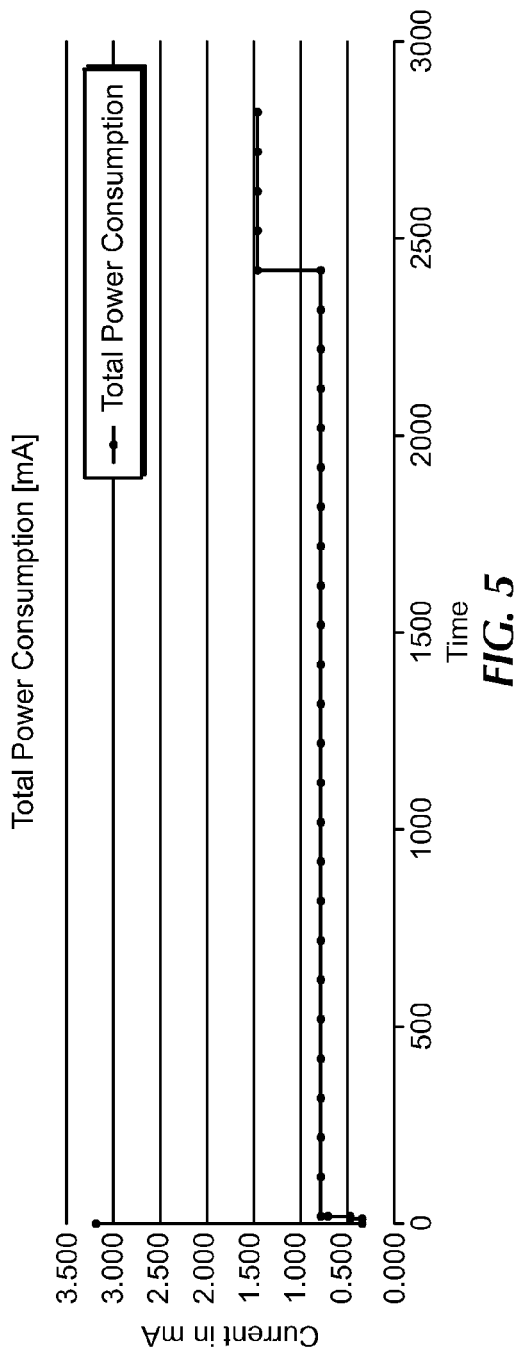
FIG. 5 is a plot of current level over time during a reset and boot sequence of a microcontroller in a low power run mode in accordance with a preferred embodiment of the present invention.
Figure 6:
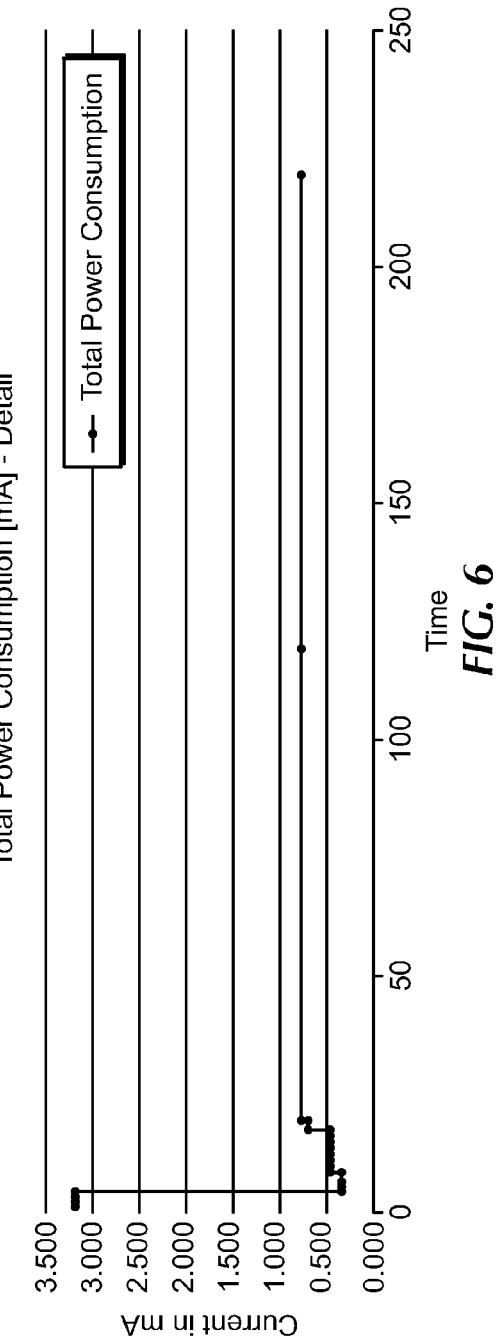
FIG. 6 is a partially enlarged portion of the plot of FIG. 3.

FIG. 5 is a plot of current levels during a reset and boot sequence of an MCU 10 in the VLPR mode, again using an internal reference clock 30 at 2 MHz. FIG. 6 is an enlargement of the plot of FIG. 3 in the first 200 ms. As can be seen from these plots, the peak generated current level during the reset and boot sequence in the VLPR mode was between 3 and 3.5 mA, with a drop down below 0.5 mA, and with the duration of the sequence falling between 0.5 and 1 mA. It should be noted that the initial peak currents are due to the charging of internal capacitances in the MCU 10 and will be generated during initial power-up of the device irrespective of the boot mode selected, although a low power mode exit followed by a reset does not require charging of internal capacitances and hence no peak is visible.

These values in either mode are much lower than the values described in prior art systems, where current levels could reach near 20 mA during the reset and boot sequences.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

Those skilled in the art will also recognize that the term "coupled" can mean direct or indirect coupling between elements for communication of data or other signals. For example, a component may be coupled to another through one or mode additional components such as switches, a BUS, or the like. Moreover, components may be combined into a single functional unit rather than being separate components connected by a wire, trace, or the like.

In the claims, the word 'comprising' or 'having' does not exclude the presence of other elements or steps then those listed in a claim. Further, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

The invention claimed is:

1. A microcontroller, comprising:
   a clock generator having an internal reference clock;
   a system mode controller configured to establish an operating mode of the microcontroller;
   a flash memory having an internal clock and a non-volatile option register; and
   a boot mode selection logic circuit coupled to the system mode controller and the flash memory and configured to output a boot mode selection signal designating that the microcontroller is to boot in a very low power run (VLPR) mode or a RUN mode,
   wherein the system mode controller is configured to enter the VLPR mode or the RUN mode in response to the boot mode selection signal,
   wherein the flash memory is configured to receive an external flash clock signal based on an output of the internal reference clock, and
   wherein the flash memory is configured to bypass and disable the internal clock
   (i) prior to calibration of the flash memory when the boot mode selection signal designates the VLPR mode, such that the flash memory is configured to calibrate, fetch information from the non-volatile option register, and initialize using the external flash clock signal, and
   (ii) prior to initialization of the flash memory when the boot mode selection signal designates the RUN mode, such that the flash memory is configured to calibrate and fetch information from the non-volatile option register using the internal clock and initialize using the external flash clock signal.

2. The microcontroller of claim 1, wherein one of the VLPR mode and the RUN mode is set as a default boot mode.

3. The microcontroller of claim 2, further comprising a real time clock circuit coupled to the boot mode selection logic circuit and configured to store an override bit,
   wherein when the override bit is set to a predetermined value, in response to receipt of the override bit, the boot mode selection logic circuit is configured to designate in the boot mode selection signal a boot mode different than the default boot mode.

4. The microcontroller of claim 2, further comprising a core configured to run a boot code following a reset sequence of the microcontroller,
   wherein the flash memory is further configured to store an override bit, and
   wherein when the override bit is set to a predetermined value, the core is configured to read the override bit out of the flash memory and instruct the system mode controller to enter the boot mode which is different than the set default boot mode.

5. The microcontroller of claim 1, further comprising a power management controller coupled to the system mode controller and configured to regulate voltage distributed within the microcontroller, and
   wherein when the boot mode selection signal designates the VLPR mode, the power management controller is configured to fully regulate the voltage until completion of initialization of the flash memory, at which time the power management controller is configured to thereafter loosely regulate the voltage.

6. The microcontroller of claim 1, wherein the information fetched from the non-volatile option register includes a bypass bit, such that when the boot mode selection signal designates the RUN mode, the flash memory is configured to disable and bypass the internal clock in response to the bypass bit.

7. The microcontroller of claim 1, wherein the internal reference clock operates in the range of 2 MHz to 4 MHz.

8. The microcontroller of claim 1, wherein the external flash clock signal has a frequency of approximately 1 MHz.

9. A method of resetting and booting a microcontroller, the microcontroller including a system mode controller configured to establish an operating mode of the microcontroller, a clock generator having an internal reference clock, and a flash memory having an internal clock and a non-volatile option register, the method comprising:

outputting, by a boot mode selection logic circuit to at least the system mode controller and the flash memory, a boot mode selection signal that designates the microcontroller to boot in a very low power run (VLPR) mode or a RUN mode;

entering, by the system mode controller during a reset sequence of the microcontroller, the VLPR mode or the RUN mode based on the boot mode selection signal;

receiving, at the flash memory, an external flash clock signal derived from an output of the internal reference clock of the clock generator; and bypassing and disabling the internal clock of the flash memory, wherein (i) when the boot mode selection signal designates the VLPR mode, the internal clock is bypassed and disabled prior to calibration of the flash memory such that the flash memory calibrates, fetches information from the non-volatile option register, and initializes using the external flash clock signal, and (ii) when the boot mode selection signal designates the RUN mode, the internal clock is bypassed and disabled prior to initialization of the flash memory such that the flash memory calibrates and fetches information from the non-volatile option register using the internal clock and initializes using the external flash clock signal.

10. The method of claim 9, wherein one of the VLPR mode and the RUN mode is set as a default boot mode.

11. The method of claim 10, wherein the microcontroller further includes a battery back-up powered real time clock circuit storing an override bit, the override bit being configured to, when set to a predetermined value, alter the boot mode selection signal to designate a boot mode different than the default boot mode, the method further comprising:

sending, by the real time clock circuit to the boot mode selection logic circuit during the reset sequence, the override bit.

12. The method of claim 10, wherein the flash memory stores an override bit, the override bit being configured to, when set to a predetermined value, alter the signal to designate a boot mode different than the default boot mode, the method further comprising:

reading, by a core of the microcontroller running a boot code following the reset sequence, the override bit out of the flash memory; and instructing, by the core when the override bit is set to the predetermined value, the system mode controller to enter the boot mode different than the default boot mode.

13. The method of claim 9, wherein the microcontroller further includes a power management controller coupled to the system mode controller and configured to regulate voltage distributed within the microcontroller, the method further comprising:

setting, by the system mode controller when the boot mode selection signal designates VLPR mode, the power management controller to perform full regulation until completion of initialization of the flash memory, at which time the system mode controller sets the power management controller to perform loose regulation.

14. The method of claim 13, wherein the power management controller includes a low voltage detector that is enabled during full regulation.

15. The method of claim 9, wherein when the boot mode selection signal designates the RUN mode, the internal clock is bypassed and disabled by the flash memory based on a bypass bit received in the information fetched from the non-volatile option register.

16. The method of claim 9, wherein the microcontroller further includes a plurality of peripheral modules, each associated with one or more clocks, the method further comprising:

gating the clocks during and/or after the reset sequence.

17. The method of claim 9, wherein the clock generator further includes a phase lock loop (PLL) and a frequency lock loop (FLL), the method further comprising:

disabling the PLL and the FLL during and/or after the reset sequence.

* * * * *